(No Model.) 7 Sheets—Sheet 1.
H. COOK.
CASH REGISTER AND INDICATOR.

No. 543,725. Patented July 30, 1895.

Witnesses
Archibald Reeves
Joseph A. Wortman

Inventor
Hugo Cook (No Model.) 7 Sheets—Sheet 2.
H. COOK.
CASH REGISTER AND INDICATOR.
No. 543,725. Patented July 30, 1895.
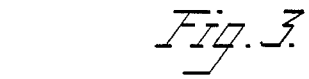
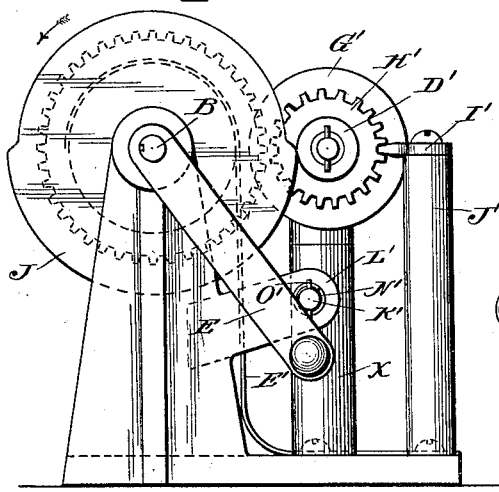
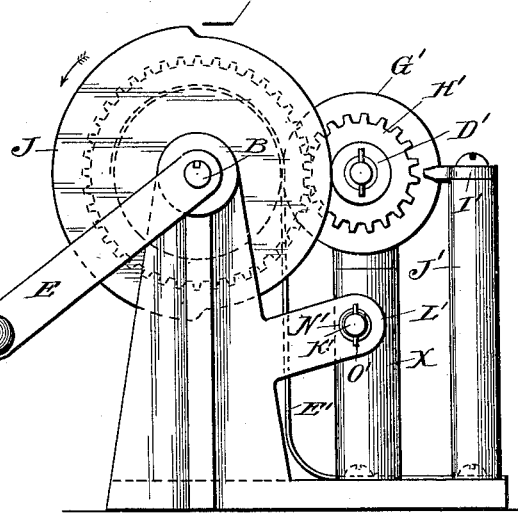
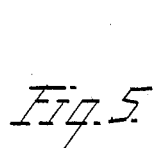
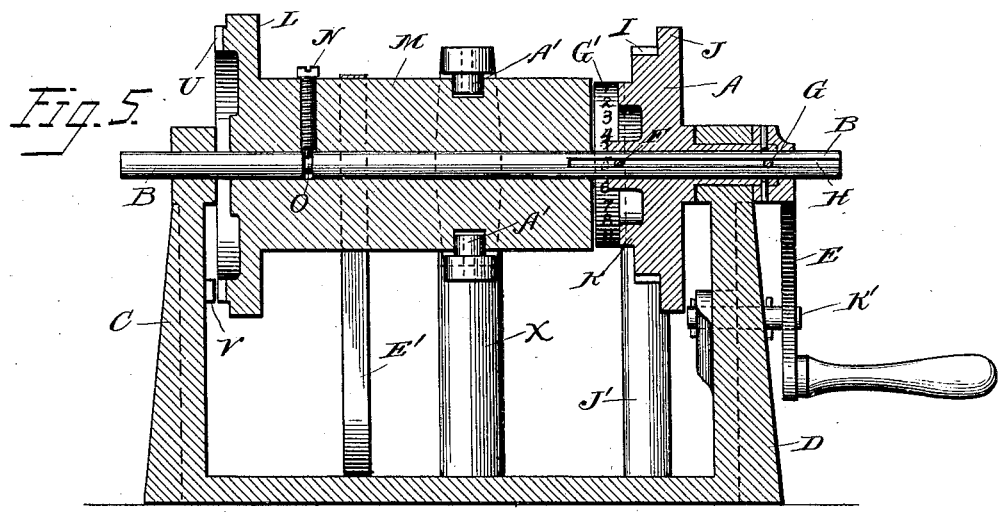
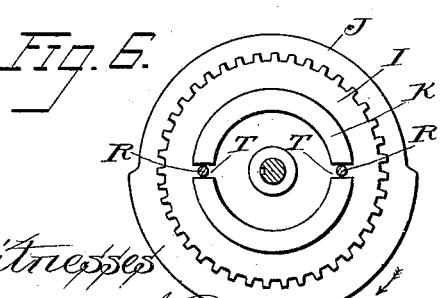
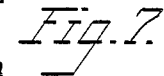
Witnesses
Archibald Reeves
Joseph A. Wortman
Inventor
Hugo Cook (No Model.) 7 Sheets—Sheet 3.

H. COOK.
CASH REGISTER AND INDICATOR.

No. 543,725. Patented July 30, 1895.

Witnesses
Archibald C. Reeves.
Joseph A. Wortman

Inventor
Hugo Cook (No Model.) 7 Sheets—Sheet 4.

H. COOK.
CASH REGISTER AND INDICATOR.

No. 543,725. Patented July 30, 1895.

WITNESSES:
Archibald C. Reeves
Joseph A. Wortman

INVENTOR
Hugo Cook (No Model.) 7 Sheets—Sheet 5.
H. COOK.
CASH REGISTER AND INDICATOR.
No. 543,725. Patented July 30, 1895.
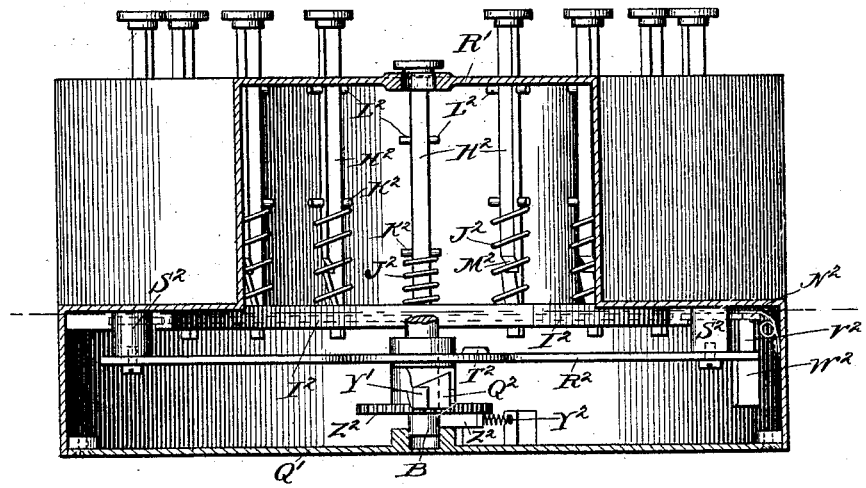
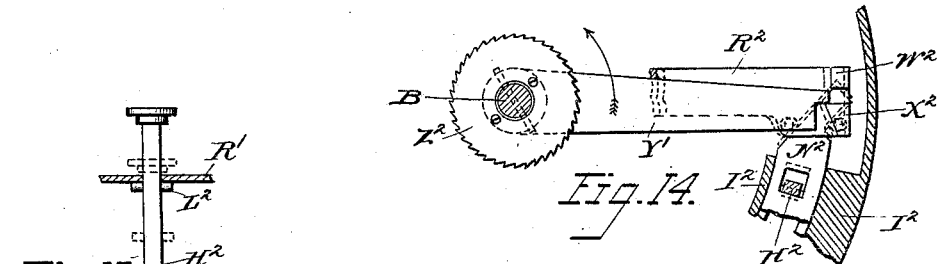
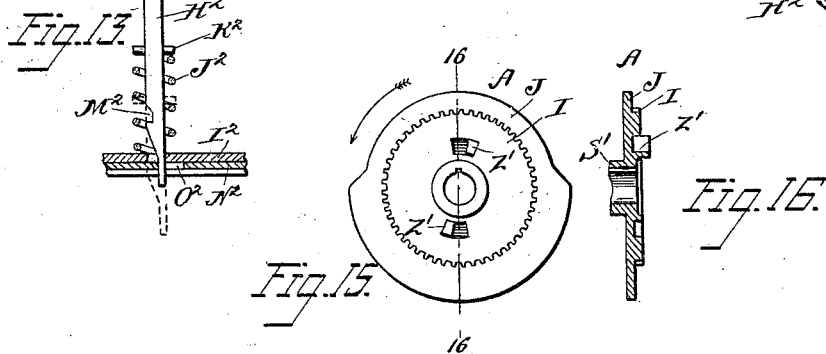
WITNESSES:
Archibald C. Reeves
Joseph A. Wortman
INVENTOR
Hugo Cook (No Model.) 7 Sheets—Sheet 6.

H. COOK.
CASH REGISTER AND INDICATOR.

No. 543,725. Patented July 30, 1895.

WITNESSES:
Archibald Reeves
Joseph A. Wonman

INVENTOR
Hugo Cook

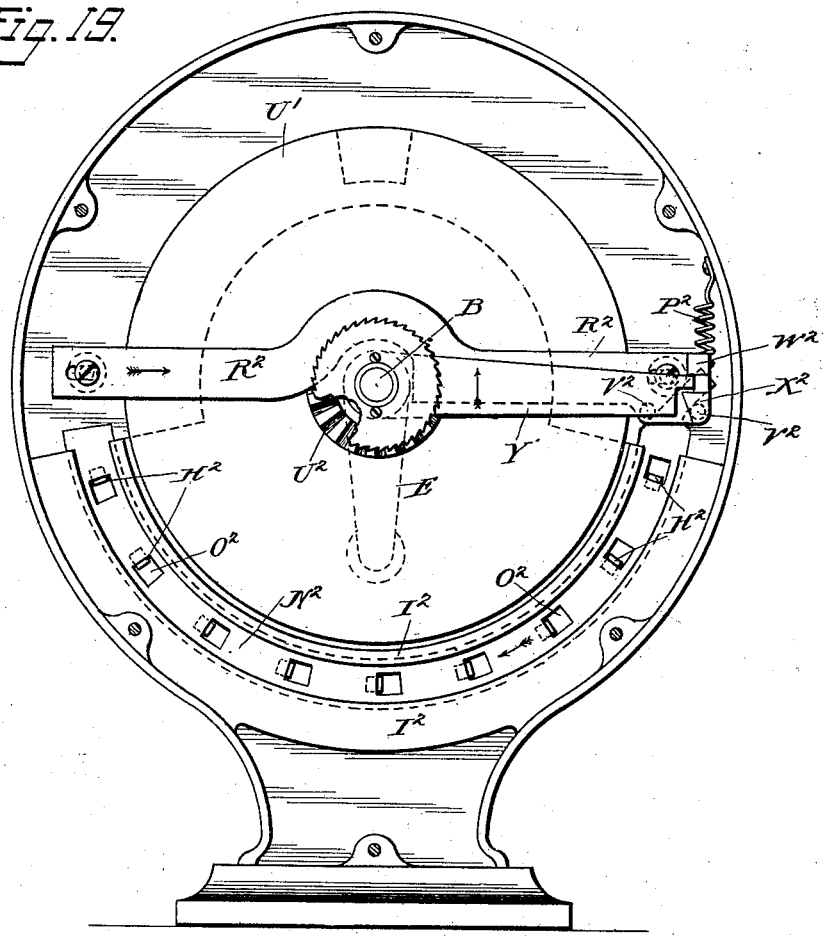

UNITED STATES PATENT OFFICE.

HUGO COOK, OF DAYTON, OHIO.

CASH REGISTER AND INDICATOR.

SPECIFICATION forming part of Letters Patent No. 543,725, dated July 30, 1895.

Application filed January 17, 1893. Serial No. 458,642. (No model.)

*To all whom it may concern:*

Be it known that I, HUGO COOK, a citizen of the United States, residing at Dayton, in the county of Montgomery and State of Ohio, have invented a certain new and useful Improvement in Cash Registers and Indicators, of which the following is a description, reference being had to the accompanying drawings, forming part of this specification.

My invention relates primarily to a new mechanical movement for such machines, and secondarily to the various combinations necessary to the embodiment of said movement in a complete machine suitable for the market, all as will be hereinafter set forth, and more particularly pointed out in the claims.

Figure 1:
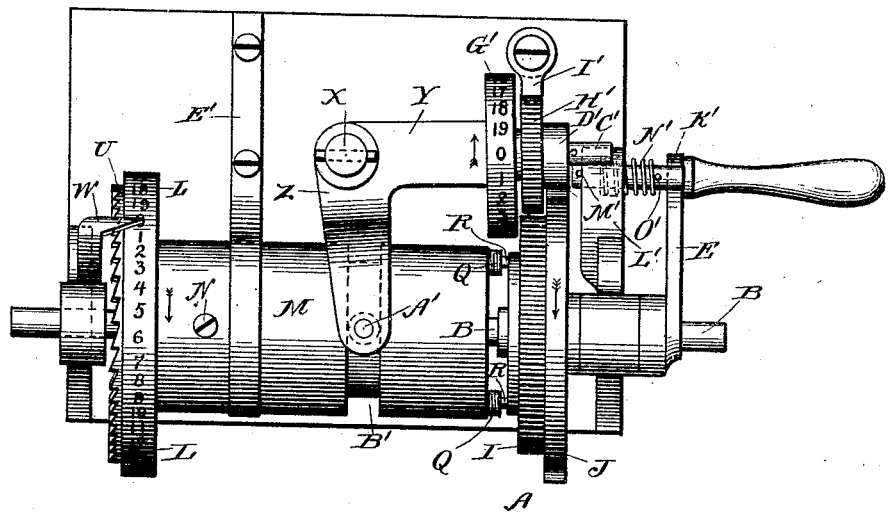
Figure 2:
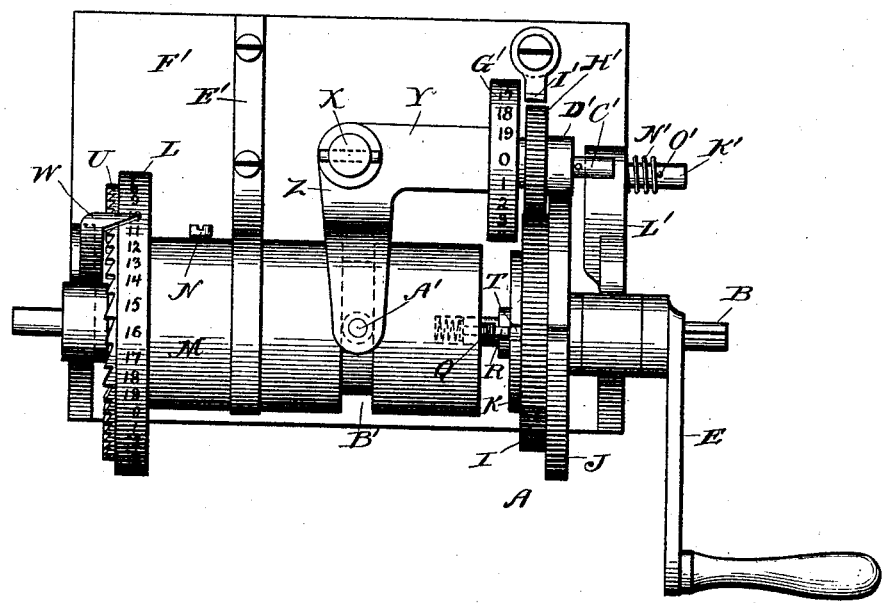
Figure 8:
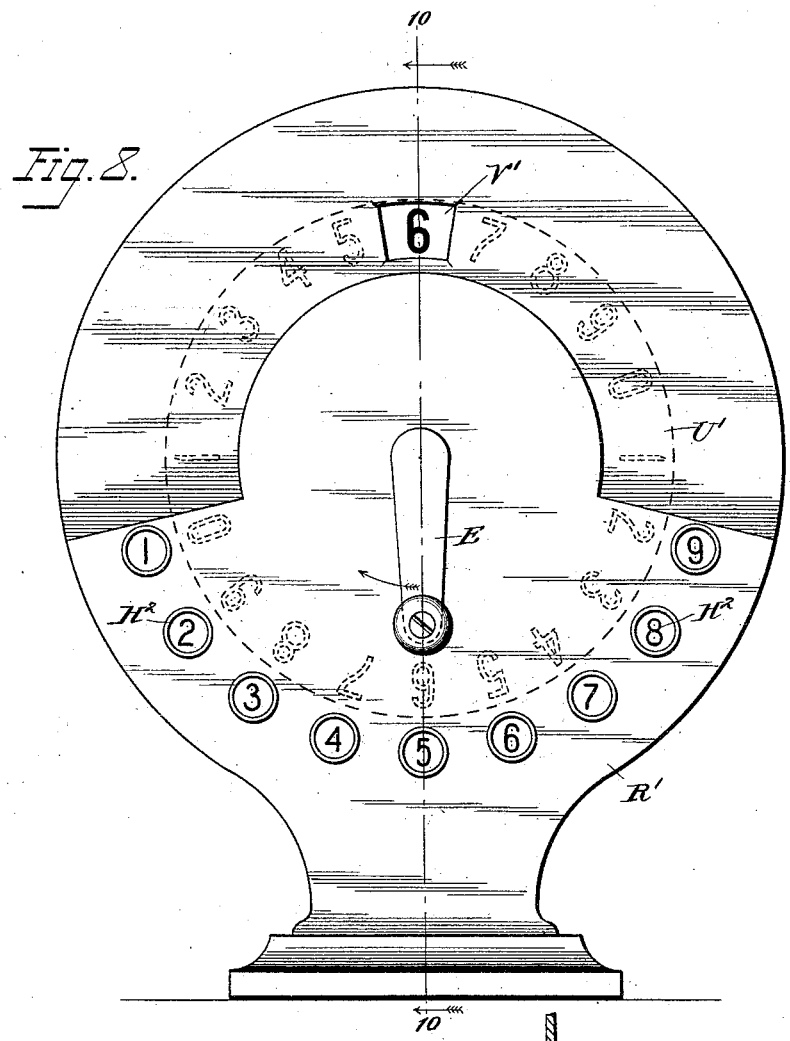
Figure 9:
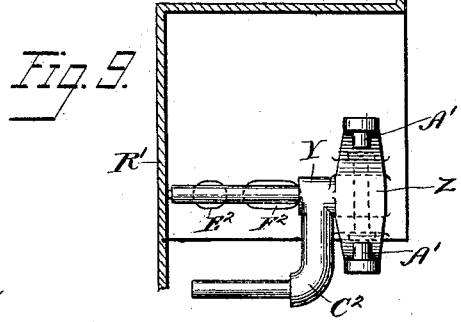
Figure 10:
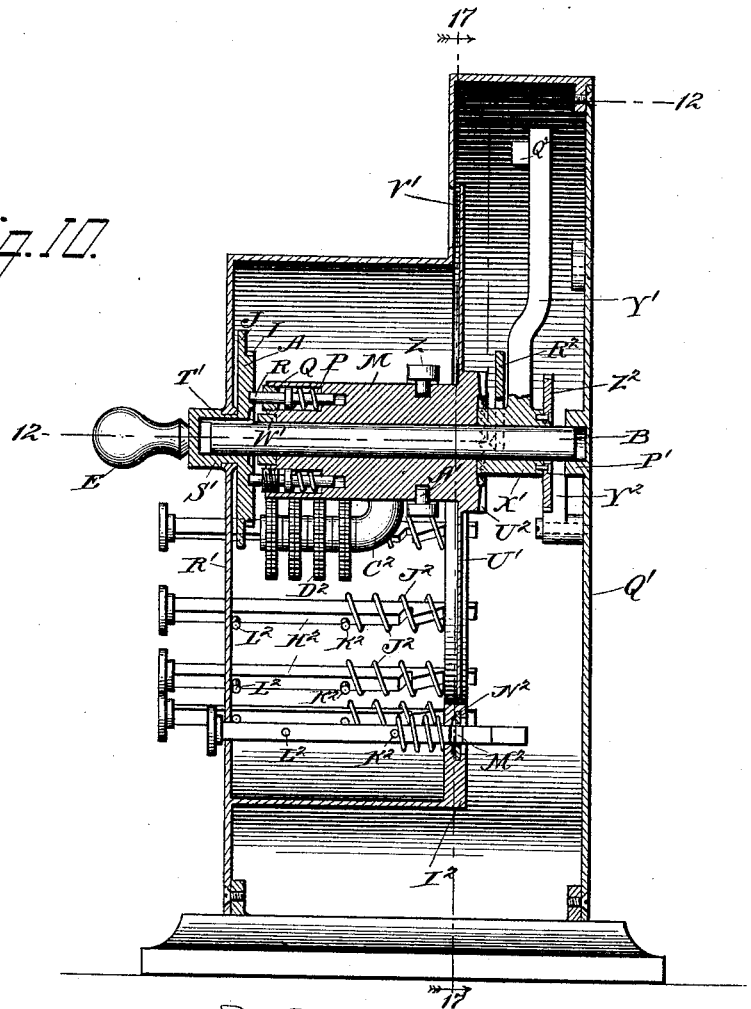
Figure 11:
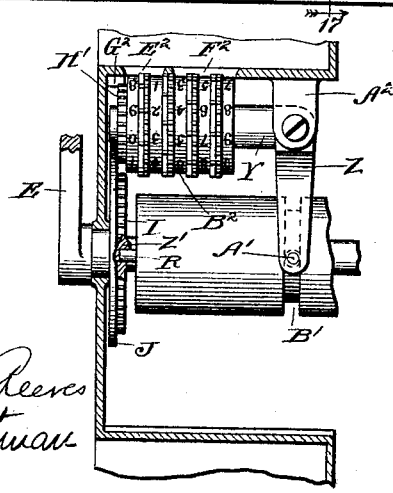
Figure 17:
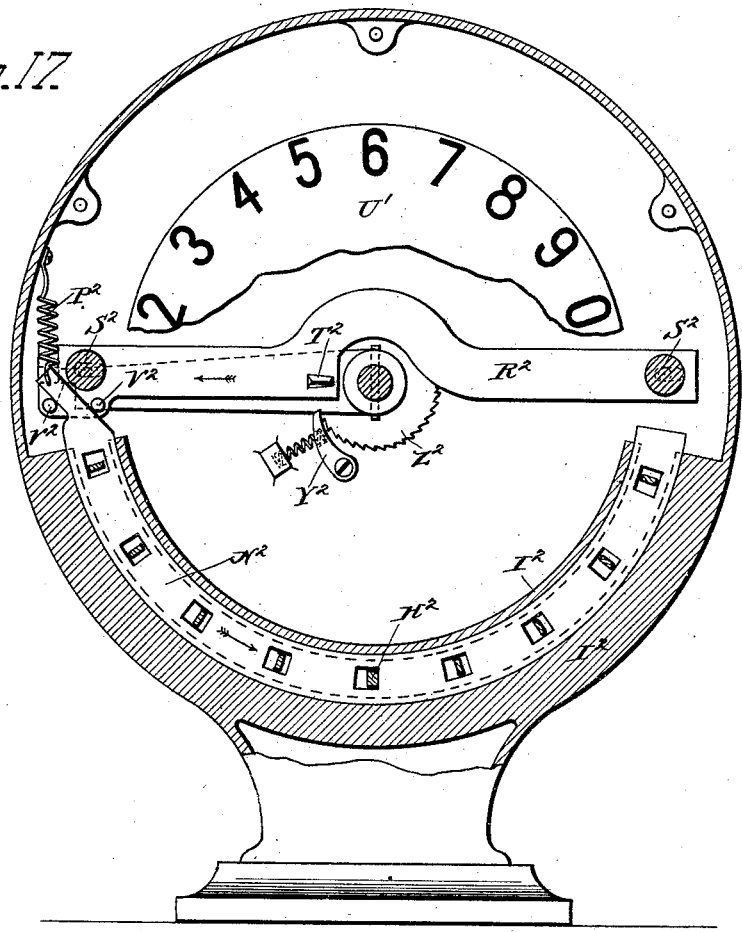
Figure 18:
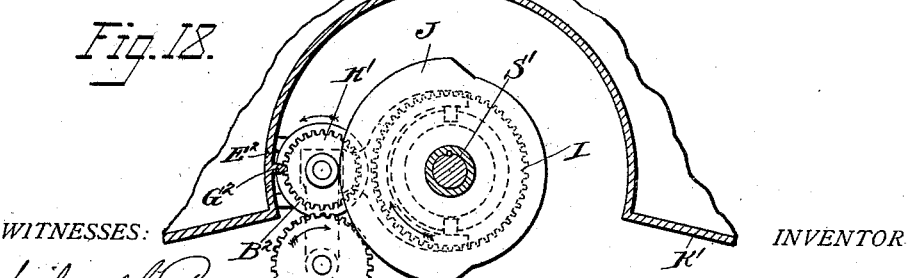

In the accompanying drawings, Figure 1 represents a top plan view of a structure embodying and illustrating my new mechanical movement with the handle of the driving member in normal position; Fig. 2, a corresponding view with the handle given about three-quarters of a revolution from normal position; Fig. 3, an end view with the handle in the position shown in Fig. 1; Fig. 4, an end view with the handle in the position shown in Fig. 2; Fig. 5, a vertical longitudinal section with the handle in normal position; Fig. 6, a detail of the driving member; Fig. 7, a sectional detail showing the connecting devices between the driving member and the indicating member; Fig. 8, a front elevation of a cash register and indicator embodying my new mechanical movement; Fig. 9, a detail of the bell-crank frame upon which the registering-wheels are mounted; Fig. 10, a vertical section of the machine on the line 10 10 of Fig. 8, with one of the operating-keys pressed in; Fig. 11, a sectional detail showing a plan view of the registering-wheels and adjacent parts; Fig. 12, a sectional plan view approximately on the line 12 12 of Fig. 10 with most of the indicating and registering devices broken away to expose the parts beneath; Fig. 13, a detail view of one of the operating-keys and its guide and detent-plates; Fig. 14, a detail view, in rear elevation, of the driving-arm and locking devices co-operating therewith; Fig. 15, a detail view of the driving-gear and cam co-operating with the registering-wheels; Fig. 16, a vertical section of the same; Fig. 17, a vertical section of the machine approximately on the line 17 17 of Figs. 10 and 12, with the lower part of the indicating-dial and its hub broken away to expose the parts beyond; Fig. 18, a sectional detail just within the front wall of the casing, showing the driving-gear and cam and the registering-wheels and gears co-operating therewith; and Fig. 19, a rear elevation of the machine with the rear wall of the casing removed and part of the ratchet upon the driving-shaft broken away to expose the notched locking-disk on the indicator.

The same letters of reference are used to indicate identical parts in all the figures.

My new mechanical movement, illustrated in the first seven figures of the drawings, consists of three principal elements—to wit, a driving member, an indicating member, and a registering member.

The driving member has a uniform movement at each separate operation, and is automatically connected with the indicating member during the first half of its movement, for the purpose of picking up the latter and carrying it to initial position. The driving member continues to carry the indicating member with it during the second half of its movement until they are disconnected at a point determined by the amount to be indicated, and simultaneously with the disconnection of the indicating member the registering member is connected with the driving member and moved by it during the remaining portion of this second half of movement of the driving member. At the end of the movement of the driving member the registering member is disconnected from it, so that at the next forward movement of the driving member the registering member remains stationary, while the driving member picks up the indicating member at that point at which it has been left and carries it forward to initial position again, as above described. It will thus be understood that the first half of the movement of the driving member is employed to pick up the indicating member and carry it to initial position and thereby destroy the previous indication, and that the second half of the movement of the driving member is employed to first turn the indicating member to position to effect the new indication and to then turn the registering member to register that indication, the last half of the movement of the driving member being thus divided between the indicating member and the registering member in proportions determined by the amount to be indicated and registered.

So far as I am aware this general mode of operation is broadly new, and I desire to secure the same, and the combination of elements necessary to carry it out, as my invention, without regard to the form of arrangement of the parts employed.

I am aware that heretofore it has been common to connect a driving member to a registering member by clutches, ratchets, and other intermediate devices well known to the art, but I believe myself to be the first to directly connect and disconnect a registering member and a single driving member connected and disconnected by any one of a series of keys, one member mounted on a movable support and adapted to engage and disengage the other. In the first seven figures of the drawings I have illustrated a very simple structure by which this new movement may be explained, and from which its embodiment in a complete machine, illustrated in the remaining figures of the drawings, may be readily understood. As there illustrated, the driver consists of a rotary member A, mounted upon a horizontal shaft B, which projects at its ends through bearing-openings in the opposite standards C D of the supporting framework. The driving member A is provided on its right-hand side with a laterally-projecting hub or sleeve which extends through the opening in the standard D, around the shaft B, Fig. 5, and has secured to its projecting end an operating crank or handle E. The member A and handle E are not fast to the shaft B, but are connected to it by pins F G, respectively, which fit in a longitudinal groove H in the shaft B, so that the latter and the member A and operating-handle must turn together, while the shaft is free to be slid longitudinally, while the member A and handle are held from such movement by the standard D. The driving member A is in this instance composed of three parts—a gear-wheel I, a cam-disk J, and an annular flange or ring K, all cast integral—the purpose of which parts will be presently explained. The indicating member in this instance consists of a numbered wheel L, carried by or formed integral with a large cylindrical hub M, mounted upon the shaft B between the driving member A and the left-hand standard C. A screw N, passed through the hub M, enters a circumferential groove O in the shaft B, so that while the shaft and indicating member are free to turn independently of each other they must move longitudinally together. The right-hand end of the hub M is provided with two diametrically-opposite bores P, Fig. 7, in which are screwed plugs Q, provided with bores in which fit sliding pins or plungers R, having enlarged inner ends or heads, between which and the ends of the bores P are confined coiled springs S, which yieldingly press the pins R outward. These pins co-operate with the ring K upon the driving member A, Fig. 6, and with two diametrically-opposite recesses or cut-away spaces T in said ring. Now, with the parts in the position shown in Fig. 1, with the operating-handle and driving member in normal position and the spring-plungers R engaged with the recesses T in the ring K of the driving member, it will be seen that if the operating-handle and driving member be turned forward in the direction of the arrow they will carry the indicating member with them and that if at any point in their forward movement the shaft B be slid to the left it will carry the indicating member with it and disengage the pins R from the driving member, whereupon the indicating member will come to rest and the driving member continue its movement alone. To positively arrest and lock the indicating member when it is disengaged from the driving member in this manner the wheel L has fast or formed upon its left-hand side a toothed ring or ratchet U, which co-operates with a locking tooth or lug V upon the inner face of the standard C. When the indicating member is slid to the left, the lug V engages a notch in the ratchet U and locks the member from further movement.

At the end of the movement of the driving member the indicating member is slid to the right again by means which may be now described. Pivotally supported upon the upper end of a post X is a horizontal bell-crank composed of the arms Y Z, the latter of which is forked and embraces the hub M of the indicating member and is provided with pins A', which fit in a circumferential groove B' in said hub. The arm Y of the bell-crank is formed into or has projecting from its end a spindle C', upon which is mounted a friction-collar D' in line and adapted to co-operate with the cam-disk J of the driving member. When the parts are in normal position, (shown in Figs. 1 and 3,) the cam-disk engages the collar D' and holds the bell-crank in the position shown in Fig. 1, with its arm Y in rearmost position and its arm Z thrown to the right and thereby holding the indicating member in its right-hand position. When the driving member completes one-half of a forward revolution the cut-away portion of the cam-disk J is brought opposite the friction-collar D'. The shaft B is thereupon free to be slid to the left, carrying the indicating member out of engagement with the driving member and rocking the bell-crank and throwing its arm Y forward until the collar D' engages the reduced periphery of the cam-disk J, as seen in Figs. 2 and 4. When the operating-handle and driving member reach normal position, however, the shoulder of the cam-disk will strike the collar D' and throw the arm Y of the bell-crank rearward again, as seen in Fig. 3, thereby shifting the indicating member N to the right to the position shown in Fig. 1. If at this movement of the indicating member the pins R stand opposite the openings T in the ring K of the driving member the pins will enter said openings, as indicated in Fig. 1; but if the pins and openings are not opposite each other at such movement of the indicating member the ends of the pins will strike the surface of the ring and be forced to the left, into the bores P, against the resistance of the springs L, and when, at the next forward movement of the driving member, they come opposite the openings T they will spring into them and connect the indicating member with the driving member, so that from this point forward the driving member will carry the indicating member with it until the shaft B is slid to the left to disconnect them in the manner before described.

The indicating-wheel L is provided with two series of numbers arranged in backward order relatively to the direction of movement of the wheel, and which in this instance represent multiples of one from 1 to 19, with two diametrically-opposite naughts between the two series. A pointer W, projecting over the wheel, in this instance, indicates the indicating-point. When the indicating member stands with either of its naughts beneath this pointer, it may be said to be in "initial position," as seen in Fig. 1. If, with the parts in the position shown in said figure, the operating-handle and driving member be turned forward to the position shown in Figs. 2 and 4, and the number 10 be brought under the pointer W, and the shaft B be thereupon slid to the left, the indicating member will be disengaged from the driving member and the wheel L will stand with its number 10 at the indicating-point, as seen in Fig. 2, while the driving member will continue its movement alone, thus leaving an indication of the number 10 exposed to view. At the end of the movement of the driving member the cam-disk J will rock the bell-crank and shift the indicating member to the right, causing the pins R to engage the surface of the ring K and be forced into the bores P in the hub M. When the driving member is in normal position, the openings T in the ring K stand in approximately a horizontal plane. When the driving member is now turned forward until the openings are brought into vertical line with each other, opposite the pins R, the latter will spring into them and the driver and indicator be thereby connected. The driving member will thereupon carry the indicating member on with it, and when it has completed one-half of its movement one of the naughts upon the wheel L will stand beneath the pointer W. During the further movement of the driving member the numbers in the next series upon the wheel L will successively pass under the pointer W in backward order until the shaft B is slid to the left again and the indicating member thereby disconnected from the driving member, whereupon the indicating member will come to rest with one of its numbers beneath the pointer W and the driving member will move on to normal position. In this manner, after an indication has been made and the driver returned to normal position, the driver will, during the first half of its next revolution, pick up the indicating member and carry it to initial position with one or the other of its naughts beneath the pointer W, and from this point will carry the indicating member with it until disconnected from it at the point desired by the sliding of the shaft B to the left. Thus at each operation the indicator is first moved from the indicating number in one series to the zero between that series and the second one, and then forward to the new indicating number in said second series, the indications being alternately made by numbers in the two series.

A brake-spring E', secured to the base-plate F' and extending upwardly and curved over and bearing upon the hub M, overcomes the frictional connection between the pins R and face of the ring K and prevents the indicating member from being turned by the driving member except when the pins R are engaged with the recesses in the ring K.

Having now described the indicating member and its mode of operation, I will next describe the registering member, which, in this instance, consists of a registering-wheel G', mounted on the spindle C' of the bell-crank arm Y, and having fast upon its right-hand side or hub a pinion H', adapted to be thrown into and out of mesh with the gear-wheel I of the driving member. When the parts are in normal position, (shown in Figs. 1 and 3,) the cam-disk J of the driving member holds the arm Y of the bell-crank in its rearmost position and the pinion H' out of engagement with the gear-wheel I; but when the shaft B is slid to the left, carrying the indicating member with it and disconnecting it from the driving member and rocking the bell-crank and throwing its arm Y forward, in the manner before described, the pinion H' is thrown into mesh with the gear I, and thus the registering-wheel is connected with the driving member simultaneously with the disengagement of the indicator from said member. As before explained, the shaft B cannot be slid to the left until the driving member has completed the first half of its revolution and carried the indicating member to initial position; but when, during the second half of the revolution of the driving member, the shaft B is slid to the left the indicating member is disconnected from the driving member and the registering member simultaneously connected with the driving member, so that during the remaining portion of the movement of the driving member it turns the registering member with it until as it reaches normal position the cam J throws the arm Y of the bell-crank rearward again and disengages the pinion H' from the gear I. The second half of the movement of the driving member is thus divided between the indicating and the registering members in proportions determined by the point in its movement at which the shaft B is slid to the left and the indicating member disconnected from and the registering member connected with the driving member. The registering-wheel G' is provided with a single series of numbers corresponding to one of the series upon the indicator-wheel L and turns forward in the order of its numbers instead of backward relatively thereto, as does the indicator-wheel. It may be assumed, in the present instance, that the second half of the revolution of the driving member is divided into twenty equal portions. If, now, the driving member be turned forward five-twentieths of the second half of its revolution before the indicating member is disconnected from it, the latter will be turned five-twentieths of a half-revolution, and five of the twenty numbers in one series will pass in backward order beneath the pointer W, bringing the number 15 beneath said pointer. When the indicating member is now disconnected from the driving member and the registering member simultaneously connected with the driving member, the driving member will turn the registering member forward during the remaining fifteen-twentieths of its second half of revolution, and will thereby turn the registering-wheel G' forward fifteen numbers and, assuming a 0 on said wheel to have been at the reading-point in Fig. 1, cause the number 15 to be exposed at that point. Of the second half of the revolution of the driving member five-twentieths have thus been transmitted to the indicating member and the remaining fifteen-twentieths to the registering member, thereby causing the number 15 to be exposed upon the indicating member and fifteen to be added upon the registering member. If the indicating member be disconnected from the driving member and the registering member connected with the driving member, when the latter has completed seven-twentieths of the second half of its revolution the number 13 would remain exposed upon the indicator and thirteen would be added upon the registering-wheel. If the driver had completed fifteen-twentieths of its second half of revolution before the shifting of the indicating and registering members was effected, fifteen of the numbers in one series on the indicating-wheel would pass in backward order under the pointer and the number 5 would remain exposed at the indicating-point, while five would be added upon the registering-wheel by the last five-twentieths of the half-revolution of the driving member, and so on, the second half of the movement of the driving member being in this manner, as before stated, divided between the indicating and registering members in proportions determined by the point at which the disconnection of the indicating member from and the connection of the registering member with the driving member was effected. The pinion H' of the registering member, as will have been understood, is provided with half as many teeth as the gear I, so that during the time the pinion is engaged with the gear it turns twice as many degrees of revolution as the gear. It will also be understood that owing to the cam J only one-half of the gear I is ever engaged with the pinion, so that the remaining half of the gear is unnecessary. A semicircular toothed segment might, therefore, be substituted for the gear.

For the purpose of positively locking the registering member when it is disconnected from the driving member at the end of the movement of the latter, I provide a locking-plate I', secured to the upper end of a post J', and which is adapted to engage and lock the pinion H' when the latter is thrown rearward by the cam J at the end of the movement of the driving member, as seen in Fig. 3.

For the purpose of arresting the operating-handle E when it reaches normal position, there is provided the usual spring-stop K', consisting of a rod passed through and adapted to slide in a hole in an arm L' of the framework, being provided with a stop-pin M' at one side of said arm and surrounded by a coiled spring N' confined between the opposite side of the arm or the bottom of a recess therein, and a second pin O' passed through the rod. The spring N' yieldingly holds the rod in its outer position in the path of travel of the operating-handle E, but it may be pushed inward out of the path of the handle E to permit the latter to move forward, and will spring outward to normal position again as soon as the handle has passed.

I am aware that it has heretofore been proposed to combine a rotary driving member, making a complete revolution at each operation, with a rotary indicator and intermediate devices, by which the driving member during the first half of its revolution will pick up the indicator and carry it to initial position and during the second half of its revolution will carry the indicator forward from initial position to the new indication, at which point the indicating member will be disconnected from the driving member and the latter will move on to normal position alone.

I am also aware that it has been proposed to combine a rotary registering member with such driving member, indicating member, and intermediate devices in such manner that the driving member will carry the registering member with the indicating member from the initial position of the latter to the point at which it is disconnected from the driving member, the registering member being simultaneously disconnected from the driving member; but, as I have before stated, I believe I am the first in the art to combine a driving member with an indicating and a registering member by any sort of intermediate or connecting devices which will cause the driving member to pick up the indicating member and carry it to initial position during the first half of the movement of the driving member, and during the second half of the movement of the driving member cause the latter to first carry the indicating member from initial position to the new indication and then release the indicating member and become connected to the registering member and transmit its movement to the latter during the remaining portion of the second half of its movement, whereby, after the indicator has been moved to initial position during the first half of the movement of said driving member, the second half of the movement of said member is divided between the indicating and registering members in proportions determined by the point at which the disconnection of the one from and the connection of the other with the driving member is effected; and I desire to secure as my invention the combination of any sort of a driving member with any sort of indicating and registering members by any sort of intermediate devices by which such mode of operation may be carried out.

Having now explained my new mechanical movement, I will proceed to describe its embodiment in a complete cash register and indicator suitable for the market, reference being had to Figs. 8 to 19, inclusive.

As seen in Fig. 10 there is a central rotary and horizontally-movable shaft B, corresponding to the shaft B heretofore described, mounted at its rear end in a bearing P' upon the rear wall Q' of the casing and projecting at its forward end through the front wall R' of the casing. Fitting over and around the front end of the shaft B is a cap or sleeve S', which extends through the front wall of the casing and has fast upon or integral with its inner end the driving member A, while the operating handle or crank E is fast upon or formed integral with its outer end. The sleeve S' is splined to the shaft B at T', so that the operating-handle and driving member A turn with the shaft, but the latter is free to move longitudinally without them. Loosely mounted upon the shaft B, in rear of the driving member A, is the hub or drum M of the indicating member, carrying, in this instance, instead of the indicating-wheel I, a flat dial U', bearing two series of equidistant indicating members, each representing the nine digits, with diametrically-opposite naughts between the two series, Fig. 8. The numbers upon this dial are adapted to be exposed singly at a sight-opening V' in the upper part of the front wall of the casing. The hub M is free to turn upon the shaft B, but is held from longitudinal movement thereon by a collar W', fast upon the shaft at the front end of the hub, and by the hub X' of an arm Y' fast upon the shaft immediately in rear of the hub M, and hereinafter described. The front end of the hub M is provided with the bores P, having the spring-pressed rods R confined in them by the screw-plugs Q, and arranged to co-operate with recesses in the driving member A in the manner heretofore described. These recesses, as seen in Figs. 15 and 16, are slightly different in form from those in Fig. 6, and have at one side lugs Z', against which the pins R are adapted to strike, as well as to engage the recesses themselves. The hub M is provided with a circumferential groove B', in which fit pins A' upon the forked arm Z of the bell-crank, which is, in this instance, pivoted at its angle between lugs or ears $A^2$ upon the side of the casing, Fig. 11. The arm Y of the bell-crank has mounted on it a train of registering-wheels $B^2$, the primary one of which corresponds to the registering-wheel G' heretofore described, and has fast upon it a pinion H', corresponding to the pinion H' in Figs. 1 to 5, and co-operating with the gear I of the driving member in the same manner. The cam-disk J of the driving member co-operates with the extreme forward end of the arm Y, or the spindle upon which the registering-wheels are mounted, to throw the pinion H' out of mesh with the gear I at the end of the stroke of the operating-handle.

As seen in Fig. 9 the arm Y of the bell-crank is provided with a pendent curved arm $C^2$ terminating in a spindle upon which are mounted the usual set of transfer-gears $D^2$, which co-operate with the registering-wheels upon the arm Y in the usual manner to cause the complete revolution of each wheel to be added upon the next higher wheel of the series. The side of the casing is provided with two reading-openings $E^2$ $F^2$ opposite the registering-wheels $B^2$, through which the numbers upon the latter can be seen. A locking lug or tooth $G^2$ is secured upon the inner face of the casing in position to engage the pinion H' when the latter is thrown out of mesh with the gear I and lock the same, as seen in Fig. 11.

In the explanation of my new mechanical movement no means was described for sliding the shaft B to disconnect the indicator from the driving member except the hand of the operator, but in the machine now being described this movement of the shaft is effected automatically by the operating-keys. These keys $H^2$ are in this instance nine in number, representing the nine digits, and arranged in the arc of a circle concentric to the shaft B, as seen in Fig. 8. They are mounted near their front ends in the front wall R' of the casing and their rear ends pass through holes in a flange-plate $I^2$ formed upon the casing. Coiled springs $J^2$, surrounding the keys between said flange-plate, and pins $K^2$, passed through the keys, yieldingly hold the keys in their outer position, their outward movement being limited by pins $L^2$ passed through them near their front ends and engaging the front wall of the casing. The rear ends of the keys are tapered or beveled off and are provided with notches $M^2$. Mounted in a guideway in the flange-plate $I^2$ is a semicircular sliding detent-plate $N^2$ provided with a series of openings $O^2$ slightly overlapping the respective openings in the flange-plate $I^2$, through which the ends of the keys pass, the ends of the keys also projecting through the openings $O^2$ in the detent-plate. A coiled spring $P^2$, connected to one end of the curved plate $N^2$, yieldingly holds it in normal position. When any one of the operating-keys is pressed inward to its limit of movement, its beveled rear end will press the detent-plate $N^2$ aside until the notch in the key comes opposite the plate, whereupon the latter will spring back into the notch and hold the key in its inner position. When the detent-plate is again moved, either by the pressing in of any other key, or by other means, the key which had been first pressed in will be released and its spring will throw it outward to normal position. When any key is pressed in and caught by the detent-plate, its rear end projects into the path of travel of a cam $Q^2$ upon the forward side of the outer end of the arm $Y'$, which is fast upon the shaft B, as before described, the result being that when in the revolution of the operating-handle and shaft the cam $Q^2$ strikes and rides over the rear end of the operated key the shaft B will be forced rearward, carrying the hub M with it and disengaging the indicating member from the driving member, so that the indicator will come to rest while the operating-handle and parts turning with it will move on to normal position alone. The arm $Y'$ is secured upon the shaft B at right angles to the operating-handle E, so that when the latter is in its normal position (shown in Fig. 8) the arm $Y'$ will occupy a horizontal position at the left of the central shaft B. It results from this that the operating-handle and driver complete a half-revolution from normal position before the arm $Y'$ is carried around to position to engage the operated key. The first half of the revolution of the operating-handle and driving member is employed to pick up the indicator where it has been left by the previous operation and carry it to initial position, as in the construction illustrated in the first seven figures of the drawings and heretofore described. During the second half of the revolution of the driver the indicator is carried with it until the cam $Q^2$ upon the arm $Y^2$ strikes the key which has been pressed in, whereupon the shaft B will be slid rearward, the indicator disengaged from the driver, the bell-crank rocked, and the registering-wheels thrown into connection with the driver, and from that point on to normal position the movement of the driver will be transmitted to the registering-wheels. Thus, in Fig. 8, if the 9 key be pressed in and the operating-handle be given a complete revolution the indicator will be picked up and turned to initial position, at which point the arm $Y'$ will stand in a horizontal position. From this point the indicator will be carried on by the driver until the cam upon the arm $Y'$ strikes the 9 key, at which moment the number 9 will stand opposite the reading-opening $V'$. The indicator will be disengaged from the driver as the cam rides over the 9 key, and its number 9 will remain exposed, while the register will be simultaneously thrown into gear with the driver and the last nine-tenths of the second half of the revolution of the driver will be transmitted to the register and add 9 upon it.

Extending horizontally across the machine, in rear of the hub M of the indicator, is a bar $R^2$, which is mounted at its opposite ends by slots and screws upon bosses $S^2$ projecting rearward from the front wall of the casing, Fig. 12. Upon the forward side of this bar $R^2$, adjacent to the shaft B, is a locking tooth or lug $T^2$, Figs. 12 and 17, adapted to co-operate with notches $U^2$ upon the rear face of the hub M, Figs. 10 and 19, to lock the latter whenever the shaft B is slid rearward and the indicator disconnected from the driver in the manner before described. The bar $R^2$ is capable of slight longitudinal movement and is provided upon the forward side of its left-hand end, Fig. 17, with two pins $V^2$, between which fits the upper left-hand end of the detent plate $N^2$, heretofore described, the end of the plate being beveled off or inclined, as shown. The result of this connection of the plate $N^2$ with the bar $R^2$ is that when the plate $N^2$ is slid in the direction of the arrow by pressing in one of the keys the bar $R^2$ will be slid in the direction of the arrow upon said bar, and when the detent-plate is released and returned to normal position by the spring $P^2$ the bar $R^2$ will be returned to its normal position. As seen in Fig. 19, which is a rear elevation, the bar $R^2$ is provided upon its rear side at one end with two lugs $W^2 X^2$, the lower end of which is beveled, as shown. When the operating-handle and parts turning with it are in normal position the extreme end of the arm $Y'$ fits between the lugs $W^2 X^2$ upon the bar $R^2$, its end being cut away and suitably shaped for that purpose. In this position of the parts the arm $Y'$ is held from forward movement by the lug $W^2$, and the shaft B, driver, and operating-handle are consequently locked from movement. They are released when the bar $R^2$ is slid in the direction of the arrow by the movement transmitted to it by the detent-plate $N^2$ whenever any one of the operating-keys is pressed in, as above described and as seen in Fig. 14, so that after any key has been pressed in the operating-handle is free to be turned to effect the indication and registration. As the arm $Y'$ completes its revolution and approaches normal position its outer end will ride over the beveled lug $X^2$ and force the bar $R^2$ in the direction of the arrow until it clears said lug. This movement of the bar $R^2$ will move the plate in the reverse direction to that indicated by the arrow upon said plate, and will thereby release the key which had been pressed in and permit its spring to throw it outward to normal position. When the end of the arm $Y'$ clears the beveled lug $X^2$ the detent-plate $N^2$ will be immediately returned to normal position by the spring $P^2$, and this movement of the plate $N^2$ will force the bar $R^2$ to the left, in Fig. 19, and carry the lug $W^2$ over the end of the arm $Y'$, thereby again locking it in normal position between the lugs $W^2 X^2$. In this manner the machine is normally locked from operation and is released by the pressing in of any one of the keys, while the operated key is released and allowed to return to normal position at the end of the operation and the machine again becomes locked. A pawl $Y^2$, spring-pressed into engagement with a ratchet $Z^2$, fast upon the rear end of the hub $X'$ of the arm $Y'$, prevents backward movement of the parts.

Having thus fully described my invention, I claim—

1. The combination of a driving member having a definite movement at each operation, an indicating and a registering member driven thereby, and suitable intermediate connecting and disconnecting devices, whereby the driving member during the first half of its movement is caused to pick up the indicating member and carry it to initial position, whereby the second half of the movement of the driving member is divided between the indicating member and the registering member in proportions determined by the point at which the one is disconnected from and the other connected with the driving member, substantially as described.

2. The combination of a rotary driving member making a complete revolution at each operation, rotary indicating and registering members driven thereby, means for automatically connecting the indicating member with the driving member during the first half of the revolution of the latter, to cause it to pick up the indicating member and carry it to initial position, and means for simultaneously disconnecting the indicating member from the driving member and connecting the registering member with the latter during the second half of the revolution of the driving member, to cause the latter to impart a given portion of the second half of its movement to the indicating member and the remaining portion to the registering member, substantially as described.

3. The combination of a rotary driving member, a rotary indicator wheel having the indicating numbers thereon arranged in backward order relatively to the direction of movement of said wheel, a registering wheel having the numbers thereon arranged in forward order relatively to the direction of movement of said wheel, and suitable connecting and disconnecting devices, whereby the driving member during the first half of its revolution picks up the indicator-wheel and turns it to initial position, and whereby the second half of the revolution of the driving member is divided between the indicator wheel and the registering wheel in proportions determined by the point at which the one is disconnected from and the other connected with the driving member, substantially as described.

4. The combination of a rotary driving member, a rotary indicator wheel provided with two series of numbers arranged in backward order relatively to the direction of movement of the wheel, a registering wheel provided with a series of numbers arranged in forward order relatively to the direction of movement of the wheel, and suitable intermediate connecting and disconnecting devices, whereby during the first half of revolution of the driving member the indicator wheel is turned to initial position, the numbers in one series thereon passing the indicating point in backward order, and whereby, during the second half of revolution of the driving member the numbers in the second series upon the indicator wheel pass the indicating-point in backward order until the number to be indicated is reached, whereupon the indicator wheel is disconnected from the driving member and the registering wheel connected with the latter, so that the indicator wheel remains stationary while the remainder of the second half of the movement of the driving member is transmitted to the registering wheel, substantially as described.

5. The combination of a driving member having a definite movement at each operation, an indicating and a registering member driven thereby, suitable intermediate connecting devices, whereby the driving member during the first half of its movement picks up the indicating member and carries it to initial position, and whereby the second half of the movement of the driving member is divided between the indicating member and the registering member in proportions determined by the point at which the one is disconnected from and the other connected with the driving member, and an arresting or locking device co-operating with the indicating member to automatically lock the latter upon its disconnection from the driving member, substantially as described.

6. The combination of a driving member having a definite movement at each operation, an indicating and a registering member driven thereby, suitable intermediate connecting devices, whereby the driving member during the first half of its movement picks up the indicating member and carries it to initial position, and whereby the second half of the movement of the driving member is divided between the indicating member and the registering member in proportions determined by the point at which the one is disconnected from and the other connected with the driving member, an arresting or locking device co-operating with the indicating member to automatically lock the latter upon its disconnection from the driving member, and a second locking device co-operating with the registering member to automatically lock the latter upon its disconnection from the driving member at the end of the movement of the latter, substantially as described.

7. The combination of a driving member having a definite movement at each operation a registering member, an indicating member whose indicating numbers are arranged in backward order relatively to its direction of movement, and suitable intermediate connecting and disconnecting devices, whereby the driving member, during the first half of its movement, is caused to pick up the indicating member and carry it to initial position, the numbers upon the latter moving in backward order past the indicating point, and whereby during the second half of the revolution of the driving member the indicating member is turned from initial position to the new indication, its numbers continuing to pass the indicating point in backward order until the number to be indicated is reached and the indicating member disconnected from the driving member and connected to the registering member, substantially as described.

8. The combination of a driving member having a definite movement at each operation, a registering member an indicating member provided with two series of indicating numbers arranged in backward order relatively to the direction of movement of the member, and suitable intermediate connecting and disconnecting devices, whereby during the first half of the movement of the driving member the indicating member is carried from its previous indicating position to initial position, the numbers in one of its series passing the indicating point in backward order, and whereby during the second half of the movement of the driving member the indicator is carried on from initial position to the number in its other series representing the amount to be indicated, the numbers in such second series passing the indicating point in backward order until the number to be indicated is reached and the indicating member disconnected from the driving member and connected to the registering member, substantially as described.

9. The combination of a driving gear or segment having a definite movement at each operation, a registering pinion arranged to be thrown into and out of engagement with said gear, means for throwing it into engagement with the gear at different points in the movement of the latter, and a cam operating to throw it out of engagement with the gear at the end of the movement of the latter, substantially as described.

10. The combination of a driving gear or segment having a definite movement at each operation, a registering pinion mounted upon a pivoted support and arranged to be swung into and out of engagement with the driving gear, means for throwing it into engagement with the driving gear at different points in the movement of the latter, and a cam co-operating with the pivoted support of the registering pinion to throw the latter out of engagement with the driving gear at the end of the movement of the gear, substantially as described.

11. The combination of a driving member provided with a gear wheel or segment and having a definite movement at each operation, a registering member provided with a pinion adapted to be thrown into and out of gear with the driving member, an indicating member movable into and out of engagement with the driving member, a bell-crank interposed between the indicating member and the registering member, to cause one to be thrown into engagement with the driving member when the other is thrown out of engagement with said member, means for rocking the bell-crank at different points in the movement of the driver, to throw the indicating member out of engagement and the registering member into engagement with the driving member, and a cam co-operating with the bell-crank to throw the registering member out of engagement and the indicating member into re-engagement with the driving member at the end of the movement of the latter, substantially as described.

12. The combination of a rotary and longitudinally movable shaft, a driving member arranged to turn with said shaft but permit independent longitudinal movement of it, an indicating member mounted to revolve upon said shaft but movable longitudinally with it into and out of engagement with the driving member, means for sliding the shaft in one direction at different points in its revolution, to disconnect the indicating member from the driving member, and means for sliding the shaft in the opposite direction at the end of its revolution, to re-connect the indicating member with the driving member, substantially as described.

13. The combination of a rotary and longitudinally movable shaft, a driving-member arranged to turn with said shaft but permit independent longitudinal movement of it, an indicating member mounted to revolve upon said shaft but movable longitudinally with it into and out of engagement with the driving member, means for sliding the shaft in one direction to disconnect the indicating member from the driving member, a bell crank connected to the indicating member, and a rotary cam co-operating with the bell-crank to throw the indicating member into re-engagement with the driving member, substantially as described.

14. The combination of a rotary and longitudinally movable shaft, a driving member arranged to turn with said shaft but permit independent longitudinal movement of it, an indicating member mounted to revolve upon said shaft but movable longitudinally with it into and out of engagement with the driving member, a bell-crank interposed between the indicating and registering members, means for sliding the shaft in one direction to disconnect the indicating member from and connect the registering member with the driving member, and a cam co-operating with the bell-crank to disconnect the registering member from and reconnect the indicating member with the driving member, substantially as described.

15. The combination of a rotary and longitudinally movable shaft, a driving member arranged to turn with said shaft but permit independent longitudinal movement of it, an indicating member arranged to revolve upon said shaft but movable longitudinally with it into and out of engagement with the driving member, a bell-crank connected to said indicating member, a registering member mounted upon said bell-crank and movable into and out of gear with the driving member, means for sliding the shaft in one direction to disconnect the indicating member from and connect the registering member with the driving member, and a cam co-operating with the bell-crank to disconnect the registering member from and reconnect the indicating member with the driving member, substantially as described.

16. The combination of a driving member having a definite movement at each operation, an indicating and a registering member driven thereby, means for automatically connecting the indicating member with the driving member during the first half of the movement of the latter, to cause it to pick up the indicating member and carry it to initial position, and a series of keys for simultaneously disconnecting the indicating member from and connecting the registering member with the driving member at different points in the second half of the movement of the latter, to cause the driving member to impart a given portion of the second half of its movement to the indicating member and the remaining portion to the registering member, substantially as described.

17. The combination of a rotary driving member, a rotary indicator having the indicating numbers arranged thereon in backward order relatively to the direction of its movement, a registering wheel having the numbers thereon arranged in forward order relatively to the direction of its movement, means for automatically connecting the indicator with the driving member during the first half of the revolution of the latter, to cause it to pick up the indicator and carry it to initial position, and a series of keys for simultaneously disconnecting the indicator from and connecting the registering member with the driving member at different points in the second half of the revolution of the latter, whereby the second half of the revolution of the driving member is divided between the indicator and register in proportions determined by the operated key, substantially as described.

18. The combination of a driving gear or segment having a definite movement at each operation, a registering pinion arranged to be thrown into and out of engagement with said gear, a series of keys and suitable connections for throwing it into engagement with the gear at different points in the movement of the latter, and a cam operating to throw it out of engagement with the gear at the end of the movement of the latter, substantially as described.

19. The combination of a driving gear or segment having a definite movement at each operation, a registering pinion mounted upon a pivoted support and arranged to be swung into and and out of engagement with the driving gear, a series of keys and connections for throwing it into engagement with the driving gear at different points in the movement of the latter, and a cam co-operating with the pivoted support of the registering pinion to throw the latter out of engagement with the driving gear at the end of the movement of the latter, substantially as described.

20. The combination of a driving member provided with a gear wheel or segment and having a definite movement at each operation, a registering member provided with a pinion adapted to be thrown into and out of gear with the driving member, an indicating member movable into and out of engagement with the driving member, a bell-crank interposed between the indicating and registering members, to cause one to be thrown into engagement with the driving member when the other is thrown out of engagement with said member, a series of operating keys and connections for rocking the bell-crank at different points in the movement of the driver, to throw the indicating member out of engagement and the registering member into engagement with the driving member, and a cam co-operating with the bell-crank to throw the registering member out of engagement and the indicating member into re-engagement with the driving member at the end of the movement of the latter, substantially as described.

21. The combination of a rotary and reciprocating shaft, a driving member arranged to turn with said shaft but permit independent longitudinal movement of it, an indicating member mounted to revolve upon said shaft and reciprocate with it into and out of engagement with the driving member, a series of keys and connections for sliding the shaft in one direction at different points in its revolution, to disconnect the indicating member from the driving member, and means for sliding the shaft in the opposite direction at the end of its revolution, to reconnect the indicating member with the driving member, substantially as described.

22. The combination of a rotary and reciprocating shaft, a driving member arranged to turn with said shaft but permit independent longitudinal movement of it, an indicating member mounted to revolve upon said shaft and reciprocate with it into and out of engagement with the driving member, a series of keys and connections for sliding the shaft in one direction to disconnect the indicating member from the driving member, a bell-crank connected to the indicating member, and a rotary cam co-operating with the bell-crank to throw the indicating member into engagement with the driving member, substantially as described.

23. The combination of a rotary and reciprocating shaft, a driving member arranged to turn with said shaft but permit independent longitudinal movement of it, an indicating member mounted to revolve upon said shaft and reciprocate with it into and out of engagement with the driving member, a bell-crank interposed between the indicating and registering members, a series of keys and connections for sliding the shaft in one direction to disconnect the indicating member from and connect the registering member with the driving member, and a cam co-operating with the bell-crank to disconnect the registering member from and reconnect the indicating member with the driving member, substantially as described.

24. The combination of a rotary and reciprocating shaft, a driving member splined thereon, an indicating member arranged to revolve upon said shaft and reciprocate with it into and out of engagement with the driver, a bell-crank connected to said indicating member, a registering member mounted upon said bell-crank and movable into and out of gear with the driving member, a series of keys and connections for sliding the shaft in one direction to disconnect the indicating member from and connect the registering member with the driving member, and a cam co-operating with the bell-crank to disconnect the registering member from and reconnect the indicating member with the driving member, substantially as described.

25. The combination of the rotary driving member A, the rotary and reciprocating indicating member M, the spring-plungers R constituting connecting devices between the two members, and means for rotating the member A and moving the member M into and out of engagement with it, substantially as described.

26. The combination of the rotary and reciprocating shaft B, the driving member A splined thereon, the indicating member M mounted to revolve upon said shaft and reciprocate with it, connecting devices, as the spring-plungers R, between the indicating and registering members, and means for rotating and reciprocating the shaft B, substantially as described.

27. The combination of the rotary driving member A having the cam disk J, the rotary and reciprocating indicating member M, connecting devices, as the spring-plungers R, between the two members, the bell-crank Y Z connected to the indicating member M and co-operating with the cam disk J, and means for rotating the member A and moving the member M out of engagement with it, substantially as described.

28. The combination of the rotary driving member A having the gear I, the rotary and reciprocating indicating member M, connecting devices, as the spring-pressed plungers R, between the two members, the bell-crank Y Z connected to the member M, the registering wheel G' and pinion H mounted on the arm Y of the bell-crank, and means for rotating the driving member A and rocking the bell-crank, substantially as described.

29. The combination of the driving member A having the gear I and cam disk J, the rotary and reciprocating indicating member M, connecting devices, as the spring-plungers R, between the two members, the bell-crank Y Z connected to the member M at one end and co-operating with the cam disk J at the other, the registering wheel G' and pinion H' mounted upon the bell-crank and co-operating with the gear I, and means for rotating the member A and moving the member M out of engagement with it, substantially as described.

30. The combination of the rotary and reciprocating shaft B, the driving member A splined thereon and having the gear I and cam disk J, the indicating member M mounted to revolve upon the shaft B and reciprocating with it, connecting devices, as the spring-plungers R, between the two members, the bell-crank Y Z having its arm Z forked and provided with pins fitting in the groove B' in the member M, and the registering wheel G' and pinion H' mounted on the arm Y of the bell-crank, substantially as described.

31. The combination of the rotary driving member A, the rotary and reciprocating indicating member M, connecting devices between the two members, means for rotating the member A and reciprocating the member M, and a locking projection V co-operating with notches in the member M, to lock the latter when it is slid out of connection with the member A, substantially as described.

32. The combination of the rotary driving member A having the gear I, the registering pinion H' movable into and out of mesh with the gear, means for rotating the member A and throwing the pinion H' into and out of gear with it at different points in its movement, and a locking projection, as I', co-operating with the pinion H' to lock the latter when it is disengaged from the gear I', substantially as described.

33. The combination of the rotary driving member A having the gear I, the registering pinion H' movable into and out of mesh with the gear I, means for rotating the member A and throwing the pinion H' into gear with it, a cam disk J for throwing the pinion H' out of gear with the member A, and the locking projection I' co-operating with the pinion H', substantially as described.

34. The combination of the rotary driving member A having the gear I and cam disk J, the rotary and reciprocating indicating member M, connecting devices between the two members, the bell-crank Y Z co-operating with the member M and cam disk J, the registering wheel G' and pinion H' mounted upon the arm Y of the bell-crank, means for rotating the member A and disconnecting the member M from it, and the locking projections V and I' co-operating respectively with the member M and pinion H', substantially as described.

35. The combination of the rotary and reciprocating shaft B, the driving member A splined thereon, the arm Y' fast thereon, the indicating member M loose thereon between the driving member A and arm Y' and reciprocating with the shaft B, connecting devices between the driving member A and indicating member M, and the keys $H^2$ co-operating with the cam $Q^2$ on the arm Y' to disconnect the indicating member M from the driving member A, substantially as described.

36. The combination of the rotary and reciprocating shaft B, the driving member A splined thereon and having the cam disk J, the arm Y' fast thereon, the indicating member M loose thereon between the driving member and arm Y' and reciprocating with the shaft B, the keys $H^2$ co-operating with the cam $Q^2$ upon the arm Y' to disconnect the indicating member from the driving member, and the bell-crank Y Z co-operating with the indicating member M and cam disk J, substantially as described.

37. The combination of the rotary and reciprocating shaft B, the driving member A splined thereon and carrying the gear I and cam disk J, the arm Y' fast upon the shaft B, the indicating member M loose upon the shaft B between the driving member A and the arm Y' and reciprocating with the shaft B, connecting devices between the members A and M, the bell-crank Y Z co-operating with the member M and cam disk J, the registering wheels $B^2$ mounted upon the arm Y of the bell-crank, the primary wheel being provided with the pinion H' co-operating with the gear I, and the keys $H^2$ co-operating with the cam $Q^2$ on the arm $Y^2$ to disconnect the indicating member M from the driving member A, substantially as described.

38. The combination of the rotary shaft B, the arm Y' fast upon said shaft, the reciprocating bar $R^2$ provided with the locking lug $W^2$ co-operating with the arm Y', the operating keys $H^2$, and the reciprocating detent plate $N^2$ co-operating with the keys and with the bar $R^2$ to move the latter and unlock the arm Y' when a key $H^2$ is pressed inward, substantially as described.

39. The combination of the rotary shaft B, the arm Y' fast thereon, the reciprocating bar $R^2$ provided with the lug $X^2$, the keys $H^2$ having the resetting springs $J^2$, and the reciprocating detent plate $N^2$ co-operating with said keys and with the bar $R^2$, whereby when the shaft B is given a complete revolution the arm Y' as it reaches normal position moves the bar $R^2$ and detent plate $N^2$ and releases the operated key, substantially as described.

40. The combination of the rotary shaft B, the arm Y' fast thereon, the reciprocating bar $R^2$ having the lugs $W^2$ $X^2$ co-operating with the arm Y', the keys $H^2$ having the resetting springs $J^2$, and the reciprocating detent plate $N^2$ co-operating with said keys and with the bar $R^2$ in the manner and for the purpose described.

41. The combination of the rotary and reciprocating shaft B, the driving member A splined thereon and having the gear I and cam disk J, the arm Y' fast upon the shaft B, the indicating member M loose upon the shaft B between the driving member A and arm Y' and reciprocating with the shaft, connecting devices between the members A and M, the indicating wheel U' carried by the sleeve M and provided with two series of numbers adapted to be exposed at the sight opening V', the bell-crank Y Z co-operating with the member M and cam disk J, the registering wheels mounted upon the arm Y of the bell-crank, the primary one having the pinion H' co-operating with the gear I, the keys $H^2$ co-operating with the cam $Q^2$ on the arm Y', the resetting springs $J^2$ for the keys, the detent plate $N^2$ co-operating with the keys, and the reciprocating bar $R^2$ co-operating with the plate $N^2$ and provided with the lugs $W^2$ $X^2$ co-operating with the arm Y', substantially as described.

42. The combination of a driving member, a registering member normally out of engagement with but bodily movable into engagement with said driving member, means including any one of a series of keys for effecting the engagement of the driving and registering members, and revoluble disengaging means therefor, substantially as described.

43. The combination of a single driving member, a registering member movable bodily into and out of engagement with said driving member, means including any one of a series of keys for effecting the engagement of the driving and registering members, and a revoluble cam for disengaging said members, substantially as described.

44. The combination of a single driving member, a registering member movable bodily into and out of engagement with said driving member, means including any one of a series of keys for effecting the engagement of the driving and registering members, a lock operating to arrest the movement of the registering member, and revoluble disengaging means therefor, substantially as described.

45. The combination of a single driving member having a constant definite movement at each operation, a registering member movable bodily into and out of engagement with said driving member, a series of keys and means cooperating therewith to throw the registering member into engagement with the driving member, substantially as described.

HUGO COOK.

Witnesses:
ARCHIBALD C. REEVES,
JOSEPH A. WORTMAN.